US011376783B2

(12) United States Patent
Goad et al.

(10) Patent No.: US 11,376,783 B2
(45) Date of Patent: Jul. 5, 2022

(54) CORNER PROFILES AND/OR CORNER REINFORCEMENT FOR LINERS AND LININGS SUITABLE FOR USE WITH TANKS AND OTHER STORAGE/CONTAINMENT VESSELS

(71) Applicants: Curtis Goad, Parkville, MO (US); Tyler Goad, Independence, MO (US)

(72) Inventors: Curtis Goad, Parkville, MO (US); Tyler Goad, Independence, MO (US)

( * ) Notice: Subject to any disclaimer, the term of this patent is extended or adjusted under 35 U.S.C. 154(b) by 12 days.

(21) Appl. No.: 16/669,135

(22) Filed: Oct. 30, 2019

(65) Prior Publication Data

US 2020/0130254 A1 Apr. 30, 2020

Related U.S. Application Data

(60) Provisional application No. 62/757,065, filed on Nov. 7, 2018, provisional application No. 62/753,775, filed on Oct. 31, 2018.

(51) Int. Cl.
*B29C 65/30* (2006.01)
*B29C 65/42* (2006.01)
(Continued)

(52) U.S. Cl.
CPC .............. *B29C 63/30* (2013.01); *B29C 65/42* (2013.01); *B29C 65/4815* (2013.01);
(Continued)

(58) Field of Classification Search
CPC . B29C 47/0002; B29C 66/61; B29C 66/1162; B29C 63/486; B29C 66/861;
(Continued)

(56) References Cited

U.S. PATENT DOCUMENTS 2,384,067 A   9/1945 Ballintine
3,080,910 A * 3/1963 Whitney, Jr. ....... B29C 65/4815
                                                    156/497

(Continued)

FOREIGN PATENT DOCUMENTS

WO   WO2015016551   2/2015

OTHER PUBLICATIONS

Extrusion Welding of Thermoplastics, the Professional Division of the Welding Institute, Mar. 2002, http://www.twi.co.uk/professional/protected/band.sub.-3/jk57.html.

(Continued)

*Primary Examiner* — George R Koch
*Assistant Examiner* — Christopher C Caillouet
(74) *Attorney, Agent, or Firm* — Harness, Dickey & Pierce, P.L.C.; Anthony G. Fussner

(57) ABSTRACT

The present disclosure relates to corner profiles and/or corner reinforcement for liners and linings that are suitable for use with tanks and other storage/containment vessels, such as process tanks, immersion tanks, indoor or outdoor containment pits, gravity feed conduits (e.g., concrete trench, canal, or drain, etc.) for transferring or conveying liquid, grain storage tanks or containers (e.g., dielectric or electrically non-conductive liners for grain storage, etc.), etc. The present disclosure also relates to tanks and other storage/containment vessels including liners and linings with corner profiles and/or corner reinforcement. Additionally, the present disclosure relates to methods, systems, and apparatus for providing corner profiles and/or corner reinforcement for liners and linings.

19 Claims, 9 Drawing Sheets

(51) Int. Cl.
  *B29C 63/30* (2006.01)
  *B29C 65/00* (2006.01)
  *B29C 65/54* (2006.01)
  *B29C 65/48* (2006.01)
  *B29C 65/52* (2006.01)

(52) U.S. Cl.
  CPC ............ B29C 65/524 (2013.01); B29C 65/54 (2013.01); B29C 66/836 (2013.01)

(58) Field of Classification Search
  CPC ......... B29C 65/12; B29C 63/30; B29C 65/42; B29C 66/43427; B29C 66/43; Y10T 428/24777; Y10T 428/24802
  See application file for complete search history.

(56) References Cited

U.S. PATENT DOCUMENTS

| | | | |
|---|---|---|---|
| 3,279,971 A | 10/1966 | Gardener | |
| 3,485,409 A | 12/1969 | Becker | |
| 3,658,627 A | 4/1972 | Kaminsky | |
| 3,853,669 A | 12/1974 | Werstlein | |
| 3,927,233 A | 12/1975 | Naidoff | |
| 3,951,308 A | 4/1976 | Thirtle | |
| 4,102,726 A | 7/1978 | Brackman | |
| 4,457,457 A | 7/1984 | Dziki | |
| 4,796,676 A | 1/1989 | Hendershot et al. | |
| 4,942,978 A | 7/1990 | Bessette | |
| 5,074,833 A | 12/1991 | Futerman | |
| 5,322,539 A | 6/1994 | Mathisen et al. | |
| 5,345,666 A | 9/1994 | Matyja | |
| 5,368,073 A | 11/1994 | Murphy | |
| 5,505,814 A | 4/1996 | Glaser et al. | |
| 5,804,112 A | 9/1998 | Greene | |
| 5,814,175 A | 9/1998 | Rau et al. | |
| 5,820,718 A | 10/1998 | Dean | |
| 5,836,363 A | 11/1998 | LaFleur | |
| 5,867,883 A | 2/1999 | Iorio et al. | |
| 5,979,686 A | 11/1999 | Dean | |
| 6,293,694 B1 | 9/2001 | Mesing | |
| 6,394,534 B1 | 5/2002 | Dean | |
| 6,431,387 B2 | 8/2002 | Piehler | |
| 6,579,439 B1 | 6/2003 | Chandler | |
| 7,111,497 B2 | 9/2006 | Goad et al. | |
| 8,133,345 B2 | 3/2012 | Goad | |
| 8,955,711 B2 | 2/2015 | Goad | |
| 9,278,478 B2 | 3/2016 | Goad | |
| 9,759,380 B2 | 9/2017 | Goad | |
| 2001/0004992 A1 | 6/2001 | Kawasaki et al. | |
| 2001/0011672 A1 | 8/2001 | Aota et al. | |
| 2001/0023566 A1 | 9/2001 | Ezumi et al. | |
| 2002/0119336 A1 | 8/2002 | Kawasaki et al. | |
| 2003/0056459 A1 | 3/2003 | Ezumi et al. | |
| 2004/0060857 A1 | 4/2004 | Pattee | |
| 2004/0067381 A1 | 4/2004 | Grund et al. | |
| 2004/0200842 A1 | 10/2004 | Low et al. | |
| 2005/0011159 A1 | 1/2005 | Standal et al. | |
| 2005/0052047 A1 | 3/2005 | McMahon et al. | |
| 2005/0129796 A1 | 6/2005 | Bortoli | |
| 2006/0051442 A1 | 3/2006 | Miceli et al. | |
| 2006/0054661 A1 | 3/2006 | Di Miceli et al. | |
| 2006/0057241 A1 | 3/2006 | Di Miceli et al. | |
| 2006/0118246 A1 | 6/2006 | Williams | |
| 2008/0245471 A1 | 10/2008 | Goad | |
| 2009/0274857 A1 | 11/2009 | Garver et al. | |
| 2010/0025337 A1 | 2/2010 | Yencho | |
| 2012/0121359 A1 | 5/2012 | Bray et al. | |
| 2012/0148805 A1* | 6/2012 | Goad ................ | B29C 66/43421 428/192 |
| 2013/0248524 A1 | 9/2013 | Goad | |
| 2017/0369236 A1 | 12/2017 | Goad | |
| 2017/0369238 A1 | 12/2017 | Goad | |

OTHER PUBLICATIONS

Plastic Welding, The Plastics Distributor & Fabricator, Mar./Apr. 2003, http://www.plasticsmag.com/features.asp?flssue=Mar./Apr.03.
Tanks and Liners: Is Conventional Wisdom or Reliance on Internet-Based Answers Putting you Company at Risk?; Curtis Goad; Dec. 3, 2010; http;//www.pfonline.com/articles.
High Strength XR-5 Geomemgranes/Durable duPont Dacron Polyester; https://www.globalplasticsheeting.com/xr-5-geomembranes; Copyright 2008-2017; 5 pages.
XR Geomembranes by Seaman Corporation; http://www.xrgeomembranes.com/ accessed Sep. 1, 2017; 4 pages.
Geomembrane; https://en.wikipedia.org/Geomembrane: March 1, 20176; 6 pages.

* cited by examiner

CORNER PROFILES AND/OR CORNER REINFORCEMENT FOR LINERS AND LININGS SUITABLE FOR USE WITH TANKS AND OTHER STORAGE/CONTAINMENT VESSELS

CROSS-REFERENCE TO RELATED APPLICATIONS

This application claims the benefit and priority of U.S. Provisional Application No. 62/753,775 filed Oct. 31, 2018 and U.S. Provisional Application No. 62/757,065 filed Nov. 7, 2018, which are incorporated herein by reference in its entirety.

FIELD

The present disclosure relates to corner profiles and/or corner reinforcement for liners and linings that are suitable for use with tanks and other storage/containment vessels, such as process tanks, immersion tanks, indoor or outdoor containment pits, gravity feed conduits (e.g., concrete trench, canal, or drain, etc.) for transferring or conveying liquid, grain storage tanks or containers (e.g., dielectric or electrically non-conductive liners for grain storage, etc.), etc. The present disclosure also relates to tanks and other storage/containment vessels including liners and linings with corner profiles and/or corner reinforcement. Additionally, the present disclosure relates to methods, systems, and apparatus for providing corner profiles and/or corner reinforcement for liners and linings.

BACKGROUND

This section provides background information related to the present disclosure which is not necessarily prior art.

Process tanks are commonly used to store contents such as acids, coating or plating materials (e.g., chromium, black oxide, etc.) and other chemicals. These tanks relate to immobile types that may be installed above or below the ground, but also for the transportable types that are part of the over-the-road semi-trailers. The tanks may also be used on or in marine vessels as well as railroad cars. The size of the tank is not material, but the larger process tanks typically hold 1,000 gallons or more. Moreover, process tanks are particularly adaptable for tanks intended for highly corrosive liquids, but also may be used in conjunction with other pourable materials such as grain and pellets.

Many process tanks are steel, which, over a period of time, may become corroded as a result of the corrosive fluids stored therein or because of the rusting action of the exterior elements (e.g., ground water, rain, etc.). If the material stored in such tanks is corrosive, the corrosive material can contact the tank. In this situation, the life expectancy of the tank is relatively short and thus it becomes not only extremely expensive for replacement, but also highly dangerous for people and the environment. Furthermore, there is danger in the event that the tanks leak or are ruptured, or somehow fail to retain the contents and leak the contents into the ground (if the tanks are subterranean). Above-the-ground storage tanks or over-the-road type tanks may also present a danger along highways and to the passing public. Accordingly, many process tanks utilize a protective liner or protective lining.

One common type of liner is a pre-fabricated "drop-in" liner. While drop-in liners may be machine welded (radio frequency welding is commonly used for these liners), the drop-in liners have disadvantages with respect to a bonded lining. During the drop-in process, air is entrapped behind the liner, which can condense and cause the mild steel tank to rust. Furthermore, during the drop-in process, creases form in the liner sheet, which stresses the liner material and leads to premature cracking and failure. Additionally, a tank part may catch the crease or protruding wrinkle and cause tear damage to the drop-in liner. When the drop-in liner develops a leak, solution seeps behind the liner pushing it off the walls or bottom and causing the liner itself to move into the process tank area resulting in operational problems. After the solution is behind the drop-in liner, the liner is very difficult to repair as it may be almost impossible to find the source of the leak. Replacing the drop-in liner creates significant downtime, especially for electroplating tanks with auxiliary equipment affixed to the tank rim, e.g., ventilation hoods, piping, anode and cathode bars, heat exchangers and probes, level control devices, etc.

Also commonly used are bonded-to-metal linings. This type of lining uses manual "flat strip" welds on the butted side panels and "corner strip" welds on the vertical joining walls and side to bottom joints.

In current lining procedures, installation personnel prepare the interior of the surface of the tank 10 (FIG. 1) to receive the lining 14. This preparation includes surface blasting the interior of the tank 10 and subsequent cleaning of the interior of the tank 10.

With respect to the lining 14, the installer cuts sheets of lining 16 (FIG. 2) from a roll of lining material. At the installation site, the installer applies an adhesive to the now cut sheets of lining 16. Then, the installer manually applies the lining sheets 16 to the interior of the tank 10. As known in the art, heat may be applied to the lining sheets 16 to assist in applying the lining sheets 16 to the tank wall. Tanks typically have protrusions such as tank welds that bond the tank walls to the tank bottom. These tank welds protrude into the interior of the tank 10. Even careful placement of the sheets 16 will result in gaps between the sheets 16 that are placed over the protruding welds. In other words, the sheets 16 will lay over the protrusions further enhancing the gaps between the sheets 16.

As shown in FIG. 2, current cutting procedures result in uneven and/or rough edges 18 for each lining sheet 16. When the installer bonds the sheets 16 to the tank 10 and next to each other, the rough edges 18 of the sheets 16 do not evenly match thus resulting in gaps 20 forming between the sheets 16. When the installer cuts relatively smooth edges 18, installation gaps 20 still exist between the adjacent sheets 16 due to the difficult and labor intensive installation process (FIG. 3). For example, the sheets 16 are heavy and difficult to manage as the installer handles the sheets 16 while positioned within the tight constraints of the process tank 10, which is a confined space with elevated temperatures. As such, the installer may apply adjacent sheets 16 in a non-uniform layout and/or with a distance between them, thereby further enhancing the gaps 20 between the edges 18 of the sheets 16. Applying the sheets 16 at a corner of the tank 10 is particularly troublesome due to the space and angle considerations of the corner of the tank 10.

After applying the lining sheets 16, the installer welds a weld strip 22 (known as a "cap over flat strip weld" or a "cap over corner strip weld") along the interface between a pair of adjacent sheets 16 (FIGS. 2 and 3). The installer manually welds the weld strip 22 to the adjacent lining sheets 16. The welder used by the installer in this process heats the weld strip 22 to the sheets 16. Similar to the application of the sheets 16, hand welding the weld strips 22 is a labor-intensive process. Maintaining consistent pressure with the welder is difficult since the touch of the installer applies the pressure. Additionally, it is difficult with the hand welder to maintain a constant distance between the welding nozzle and the welding strip. Furthermore, the weld strip may melt faster than the sheet 16 such that the welding process must be done with special care. The sheets 16 must be heated to a glossy state, yet the weld strip or the sheets 16 cannot be charred as that would result in a failed weld.

The installer typically welds from the top of the lining sheet 16 to the bottom. As the process tank 10 may have a height such as twelve feet, this height causes starts and stops as opposed to continuous welds with tightly controlled temperatures and consistency in both pressure and timing. In addition, welding occurs within the tight constraints of the process tank 10 such that the installer is unable to provide a constant weld over any length of time. The tedious and laborious process for strip welding not only applies to welding strips to corner sheets, but it also applies to welding strips for sheets applied to the walls of the process tank 10.

The human element of welding the strips 22 leads to weak welds (inconsistency of temperature, pressure and timing—the critical variables for welds) and leads to voids or "pinholes" 24 within the weld that bonds the weld strip 22 to the sheets 16 (FIG. 4). The pinholes 24 shown in FIG. 4 are exaggerated for purposes of clarity. Although the welded strip 22 may pass a "spark test" commonly used in the art, these pinholes 24 lead to problems for the process tank 10. Furthermore, the corner weld that bonds the sides and the bottom of the process tank 10 further exaggerates the effects of the gaps 20 and the pinholes 24 because the sheet 16 must position over the corner weld of the process tank 10. This corner weld or other obstacle leaves a void between the sheet 16 and the tank weld.

When the tank 10 is filled with fluid 12 (FIG. 1) such as an acid, the pressure of the fluid forces the fluid through the pinholes 24. Consequently, the fluid forces through the gaps 20 and disperses between the lining 14 and the tank 10. This leaked fluid then corrosively attacks the tank wall. Additionally, this leaked fluid may also corrosively attack the bond or adhesive interface between the lining 14 and the tank wall resulting in the lining 14 pulling away from the tank wall. Accordingly, the gaps 20 and the pinholes 24 between the lining sheets 16 lead to adverse and dangerous conditions. When the installer repairs the welded strip, the heat from the repair welder draws the leaked fluid toward the interface of the adjacent sheets 16, wherein this fluid further attacks the tank wall positioned behind the repaired weld strip.

DRAWINGS

The drawings described herein are for illustrative purposes only of selected embodiments and not all possible implementations, and are not intended to limit the scope of the present disclosure.

FIG. 1 also illustrates fluid that has seeped through the lining and is between the tank walls and the lining.

FIG. 2 illustrates a pair of lining sheets, a welded strip weld between the pair of lining sheets, and gaps between the lining sheets.

FIG. 3 illustrates a pair of lining sheets having smooth edges, a welded strip weld between the pair of lining sheets, and a gap between and along the length of the edges of the lining sheets.

As shown in FIG. 4, pinholes have formed in the weld that bonds the weld strip to the lining sheets.

Corresponding reference numerals indicate corresponding (though not necessarily identical) parts throughout the several views of the drawings.

DETAILED DESCRIPTION

Figure 1:
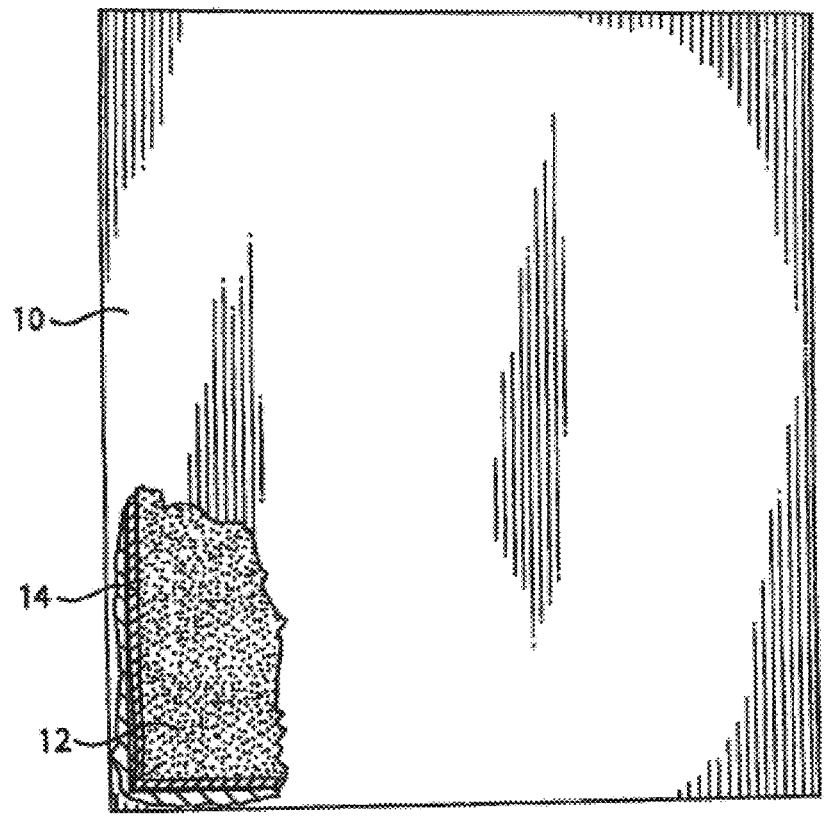
FIG. 1 is a front elevation view of a tank with a partial cross sectional view thereof illustrating a conventional bonded lining applied to the tank walls.
Figure 2:
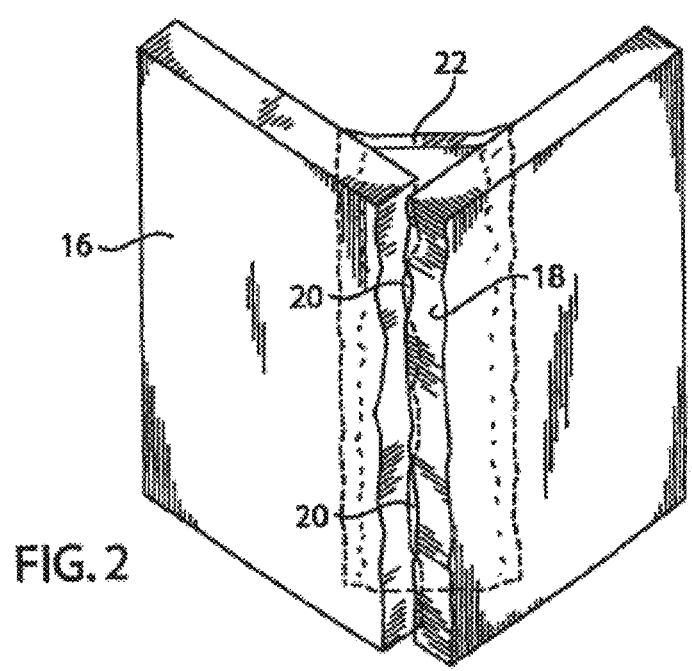
FIG. 2 is a partial perspective view of a corner of a conventional lining.
Figure 3:
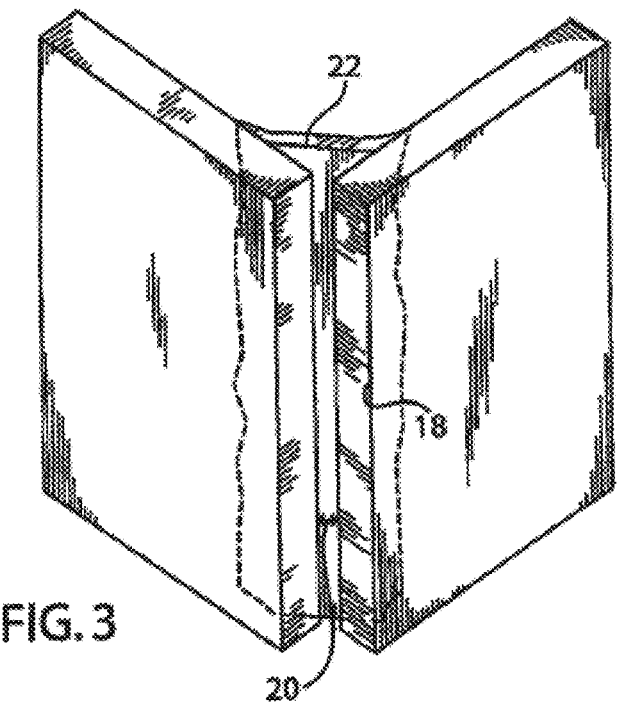
FIG. 3 is a partial perspective view of a corner of another conventional lining.
Figure 4:
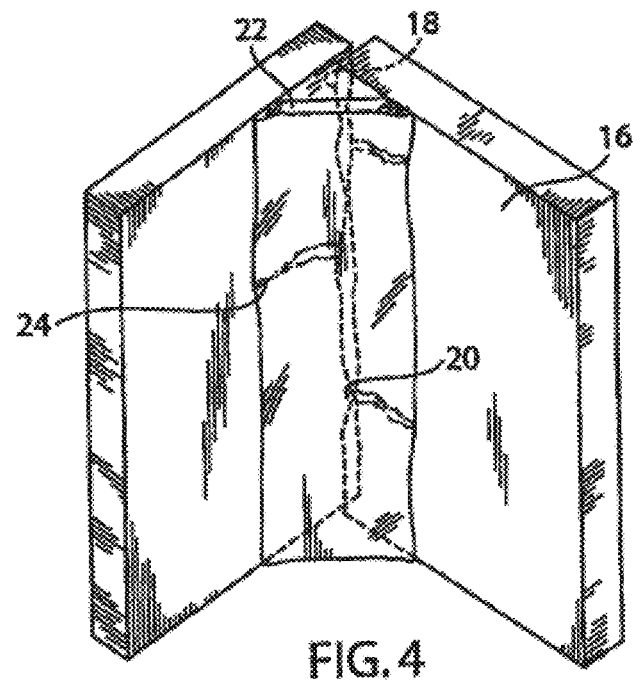
FIG. 4 is a front perspective view of the lining sheets, weld strip, and gaps shown in FIG. 3.

Example embodiments will now be described more fully with reference to the accompanying drawings.

According to various aspects, exemplary embodiments are disclosed that include corner profiles and/or corner reinforcement for liners and linings. The liners or linings are suitable for use with tanks and other storage/containment vessels, such as process tanks, immersion tanks, indoor or outdoor containment pits, gravity feed conduits (e.g., concrete trench, canal, or drain, etc.) for transferring or conveying liquid, grain storage tanks or containers (e.g., dielectric or electrically non-conductive liners for grain storage, etc.), etc. Also disclosed are tanks and other storage/containment vessels including liners and linings with corner profiles and/or corner reinforcement. Additionally, disclosed are methods, systems, and apparatus for providing corner profiles and/or corner reinforcement for liners and linings.

In exemplary embodiments, a liner or liner may be formed from sheets, panels, or walls extrusion welded together by infusing molten thermoplastic material within the interfaces of adjacent sheets. For descriptive purposes only, the terms "liner" and "lining" may be used interchangeably herein. Also for descriptive purposes only, the term "liner" may also be used herein to refer to a free standing liner (e.g., drop-in liner, etc.) for a tank which liner will not be or is not bonded to a tank's surfaces. Additionally, the term "lining" may also be used herein to refer to a lining for a tank that will be or is bonded to a tank's surfaces.

Exemplary embodiments relate to methods of lining tanks having sidewalls and a bottom that intersect to define internal corners of the tank. In an exemplary embodiment, a method generally includes positioning an elongate member (e.g., member 591 in FIGS. 5 through 7, etc.) within an internal corner of the tank lengthwise along a length or height (e.g., from top to bottom, etc.) of the tank's internal corner.

The method also includes positioning a lining sheet along the member. The lining sheet may be adhesively attached to the member by using double sided adhesive tape (e.g., 3M very high bond (VHB) double sided adhesive tape, etc.), etc.

The lining sheet may be extrusion welded. During the extrusion welding, molten thermoplastic weld material may flow into and fill gaps between the lining sheet and the member and/or between the lining sheet and tank walls defining the internal corner. Infused weld areas may thus be created that help to eliminate channels, pinholes, gaps, etc. behind the weld seams, which, in turn, helps reduce the probability of leaks and helps increase the service life of the tank, pit, storage vessel, etc. in which the lining is used. If a leak happens, then the weld also helps block solution from flowing behind the lining.

Adding the member along the tank's internal corner changes the corner profile, e.g., changes the corner's perpendicular profile to a non-perpendicular corner profile and/or a cornerless profile, etc. Advantageously, the corner profile (as reconfigured by the addition of the member along the tank's internal corner) may enable a continuous higher quality extrusion weld between adjacent side and bottom lining sheets along an inside bottom corner of the tank.

The inner bottom corners where three intersecting lining sheets must be joined are typical problem areas and a frequent source of early leaks and premature lining failures with conventional linings in that it is difficult to perform a high-quality weld in a corner. This is because high-quality welds need the right speed, temperature, and pressure as the welding machine is moved along the joint. But at a corner, the lining sheets can't be preheated because the welding machine stops. In exemplary embodiments disclosed herein, the corner profiles (as reconfigured by the addition of the members along the tank's internal corners) enable continuous higher quality extrusion welds between adjacent side and bottom lining sheets along inside bottom corners of the tank. Also with the hot gas/hot air extrusion welding machine techniques, the welding rod may be fully melted, which results in a homogenous weld with fewer stresses. The weld may be formed in a single pass thereby further reducing stresses that would otherwise be introduced by the multiple passes common in traditional hand welding. Accordingly, exemplary embodiments disclosed herein may allow for extrusion welding that is faster and is less sensitive to surface oxidation.

The member may be made from a relatively rigid material(s), such as steel or other suitable material. The member may comprise a rigid flat plate, rigid radiused member, etc. In an exemplary embodiment, the member may comprise a hollow steel beam having a profile or cross-section shaped as a right triangle.

Figure 8:
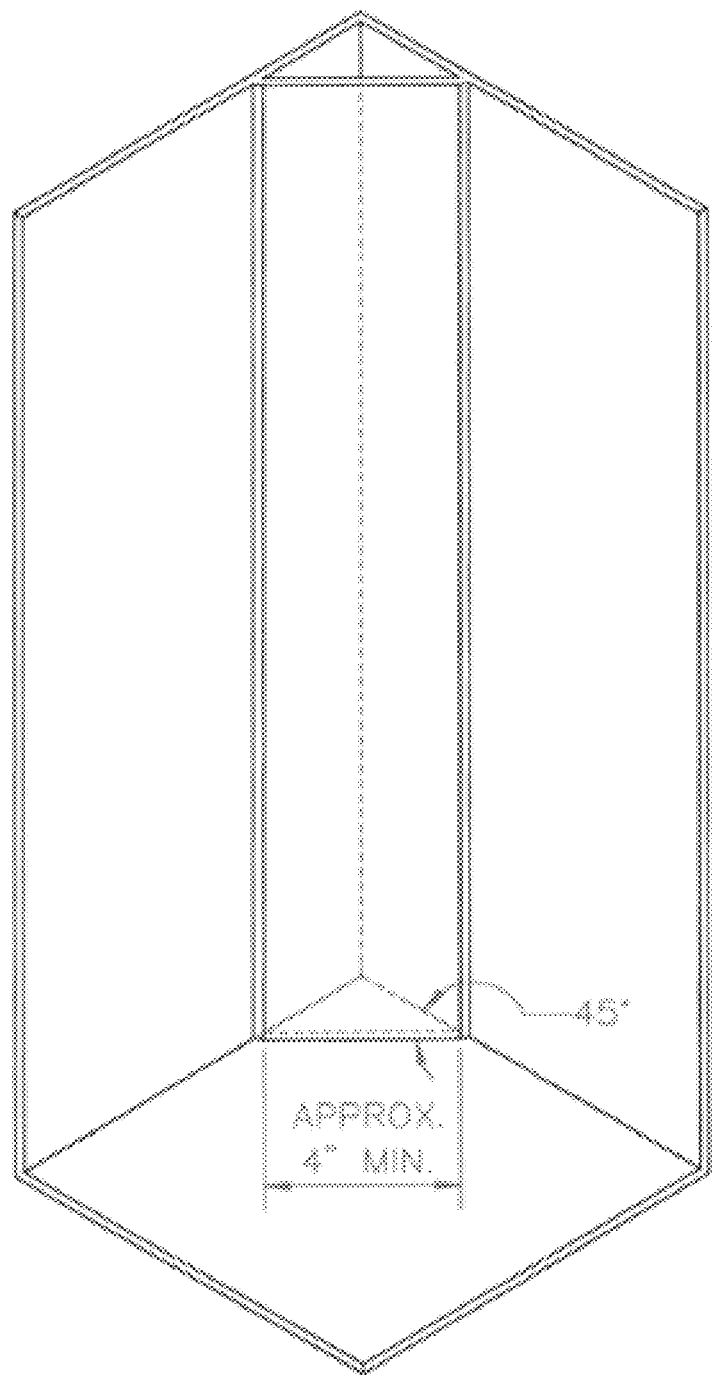
FIG. 8 is a partial perspective view of the portion of the tank including the corner profile shown in FIG. 5 with exemplary dimensions provided for purpose of illustration only.

The member may be configured such that an internal angle of about 45 degrees (or an external angle of about 135 degrees) is defined between the member and each of the tank's adjacent sidewalls when placed within the tank's internal corner. See, for example, FIG. 8 showing a member configured to have a profile or cross section in the shape of a right isosceles right triangle.

In alternative embodiments, the tank may be initially made to integrally include internal corners configured to have non-perpendicular corner profiles and/or cornerless profiles as disclosed herein. In which case, the tank may provide similar advantages of allowing continuous higher quality extrusion welds between adjacent side and bottom lining sheets along an inside bottom of the tank without having to separately add members along the internal tank corners.

Conventionally, a plurality of lining sheets may be bonded to the sidewalls of a tank. Adjacent pairs of the lining sheets may be extrusion welded to each other. In exemplary embodiments disclosed herein, however, the non-perpendicular corner profiles and/or cornerless profiles of the tank's internal corners may advantageously enable a single lining sheet to be bonded to the tank's sidewalls instead of using a plurality of lining sheets that are bonded to the tank's sidewalls and extrusion welded to each other. Accordingly, the total number of required welds in the tank may thus be reduced by using a single lining sheet instead of a plurality of lining sheets that must be extrusion welded to each other. And, the reliability of the lining may also increase due to the reduction in the total number of welds.

Figure 5:
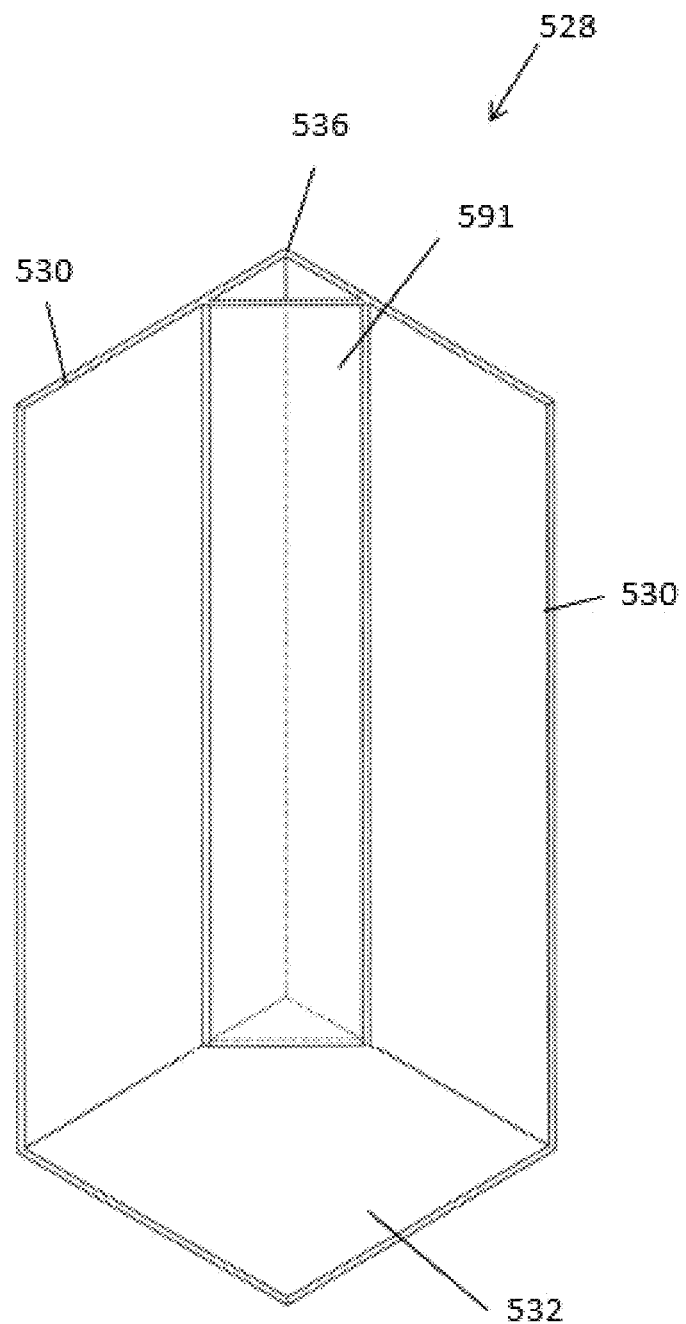
FIG. 5 is a partial perspective view of an exemplary embodiment of a tank including a corner profile in accordance with and embodying one or more aspects of the present disclosure.
Figure 6:
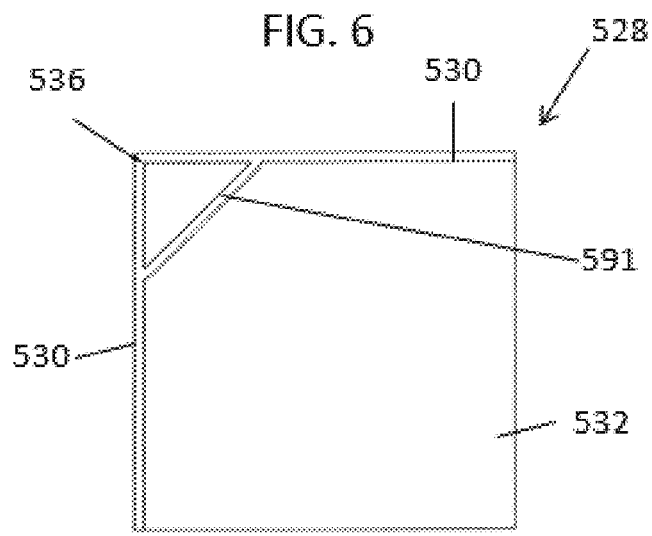
FIGS. 6 and 7 are respective top and side views of the portion of the tank and member along the tank's internal corner shown in FIG. 5.
Figure 7:
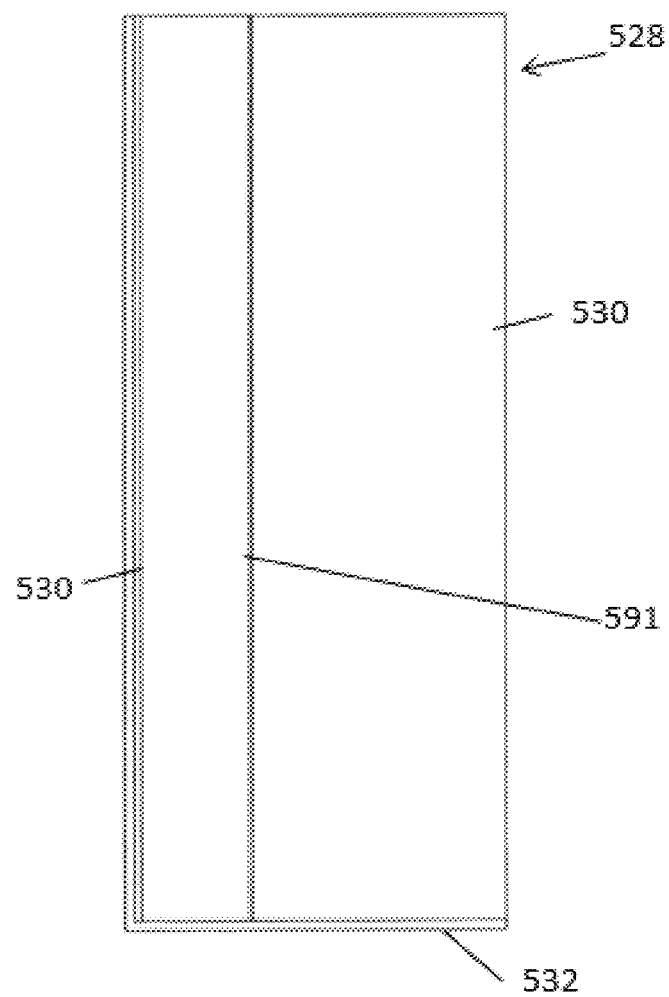

With reference to the figures, FIGS. 5 through 7 show a portion of a tank 528 including a corner profile in accordance with and embodying one or more aspects of the present disclosure. As show in FIG. 5, a member 591 is disposed along a length of the tank's internal corner 536. The tank's internal corner 536 is defined by or formed between the bottom 532 and adjacent sidewalls 530 of the tank 528. By way of example only, the tank 528 may comprise a steel process tank. But other exemplary embodiments may include a lining or liner that is configured for differently configured tanks other than steel process tanks as the liners, linings, and welding techniques disclosed herein may be used with steel, wood, concrete, fiberglass, and other substrates that require corrosion protection.

With continued reference to FIG. 5, adding the member 591 along the tank's internal corner 536 changes the corner profile, e.g., changes the corner's perpendicular profile to a non-perpendicular corner profile and/or a cornerless profile, etc. Advantageously, the corner profile (as reconfigured by the addition of the member 591 along the tank's internal corner 536) may enable a continuous higher quality extrusion weld between adjacent side and bottom lining sheets along an inside bottom corner of the tank 532.

The member 591 may be made from a relatively rigid material(s), such as steel or other suitable material. The member 591 may comprise a rigid flat plate, rigid radiused member, etc. In this illustrated embodiment, the member 591 comprises a hollow steel beam having a profile or cross-section shaped as a right triangle (e.g., an isosceles right triangle, etc.) as shown in FIG. 6.

The member 591 may be configured (e.g., shaped, sized, etc.) such that an internal angle of about 45 degrees (e.g., FIG. 8, etc.) is defined between the member 591 and each of the tank's adjacent sidewalls 591 when the member 591 is placed within the tank's internal corner 591. Stated differently, the member 591 may be configured such that the transition from the tank sidewalls 530 to the member 591 is at an angle of about 135 degrees.

For example, FIG. 8 shows an internal angle of 45 degrees defined between a member and each of the tank's adjacent sidewalls. The member has a minimum width of about 4 inches. By way of example only, the tolerance may be plus or minus ⅛ inch for tanks under ten feet long and plus or minus ⅛ for tanks over ten feet long. The dimensions disclosed herein and shown in FIG. 8 are provided as examples over as other exemplary embodiments may be configured differently, e.g., with different dimensions, etc.

In alternative embodiments, the tank may be initially made to integrally include internal corners configured to have non-perpendicular corner profiles and/or cornerless profiles as disclosed herein. In which case, the tank may provide similar advantages of allowing continuous higher quality extrusion welds between adjacent side and bottom lining sheets along an inside bottom corner of the tank without having to separately add members (e.g., member 591, etc.) along the internal corners of the tank.

Figure 9:
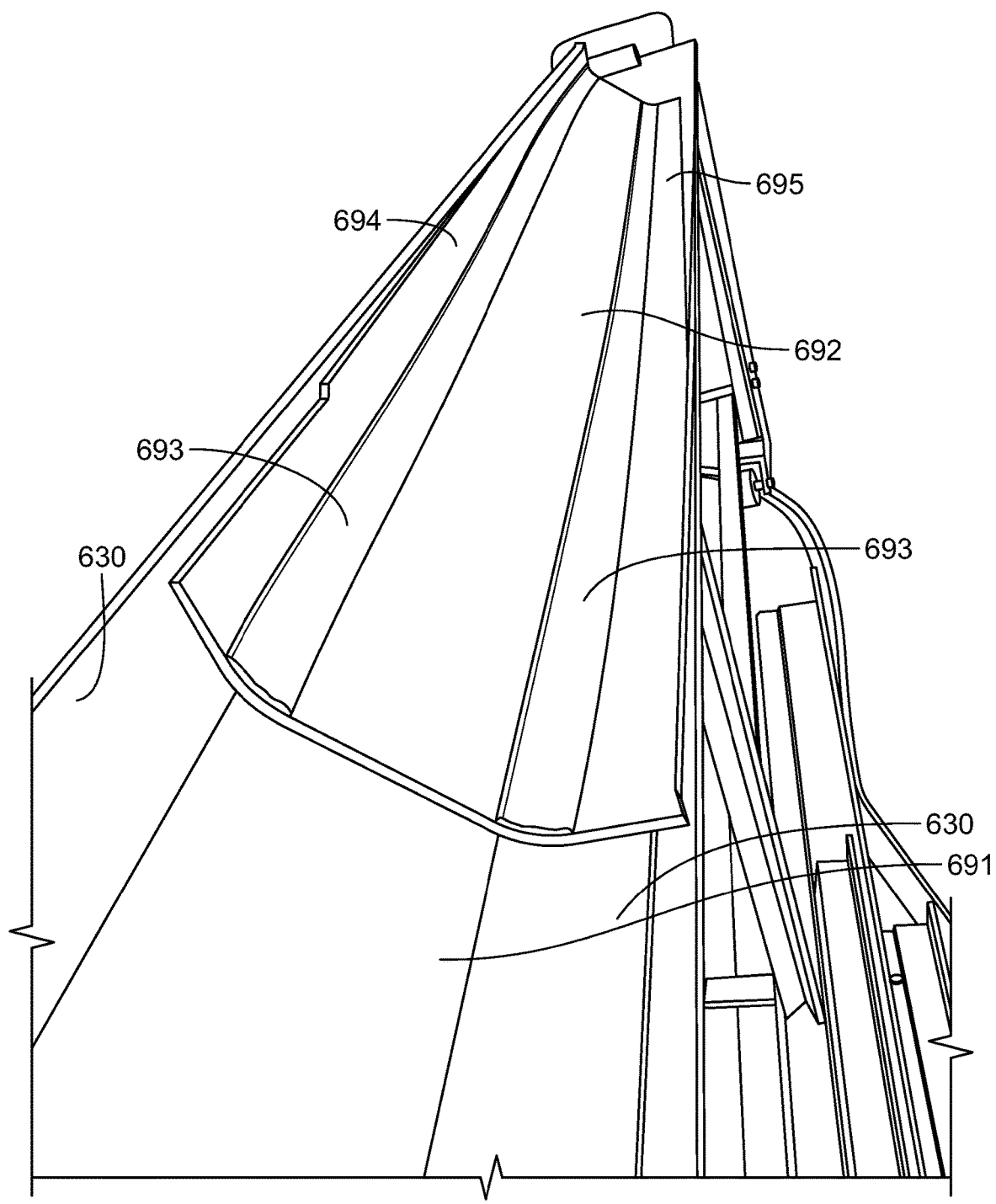
FIG. 9 shows an exemplary embodiment including extrusion welds along a single liner sheet that create or impart a shape to the liner sheet, which shape will be permanently formed rather than flattened out when folded, etc. for making a drop-in bag" liner in accordance with and embodying one or more aspects of the present disclosure.

An exemplary method for providing a lining or liner to the tank 528 (FIG. 5) will now be provided. In this example, the method includes positioning the member 591 within the internal corner 536 of the tank 528 lengthwise along a length of the tank's internal corner 536. A lining or liner sheet may then positioned along the member 591. For example, FIG. 9 illustrates a lining or liner sheet 692 positioned along the member 691. The lining or liner sheet 692 may be adhesively attached to the member 691 by using double sided adhesive tape (e.g., 3M very high bond (VHB) double sided adhesive tape, etc.), etc.

The lining sheet 692 may be extrusion welded. As shown in FIG. 9, extrusion welds 693 are along the single liner sheet 692. The extrusion welds 693 create or impart a shape to the liner sheet 692, which shape will be permanently formed rather than flattened out when folded, etc. for making a drop-in bag" liner.

Side lining sheets may be extrusion welded to the corner lining sheet 692 and/or to each other. For example, the corner lining sheet 692 includes first and second opposite edge portions 694, 695 as shown in FIG. 9. Edge portions of the side lining sheets may be positioned adjacent and/or along the first and second edge portions 694, 695 of the corner lining sheet 692. In some exemplary embodiments, lining sheets may be RF (radio frequency) or dielectric welding may be used for making the sidewalls (e.g., of a bag liner, etc.) with at least one overlap extrusion weld to make a final weld and make all four sidewalls come together.

The side lining sheets may be coupled (e.g., adhesively attached, etc.) to the tank sidewalls 630 to retain the side lining sheets in place before being extrusion welded to the corner lining sheet 692. The side lining sheets may be extrusion welded to the corner lining sheet 692 by infusing a molten thermoplastic material along and/or within an interface between the edges portions 694, 695 of the corner lining sheet 692 and the corresponding edge portions of the side lining sheets. In other exemplary embodiments, RF or dielectric welding may be used for attaching side lining sheets to the corner lining sheet 692.

The method may further include extrusion welding the corner lining sheet 692 and side lining sheets to a bottom lining sheet by infusing molten thermoplastic material along and between the side lining sheets, corner lining sheet 692, and bottom lining sheet. The infused thermoplastic material may seal the side sheets, corner lining sheet 692, and the bottom lining sheet to thereby isolate the lined tank from the contents (e.g., contents being stored and/or processed, etc.) within the lined tanks, as the contents contact the side lining sheets, corner lining sheet 692, and bottom lining sheet instead of the tank's walls 530, 630 and bottom 532.

In exemplary embodiments, side lining sheets, corner lining sheets, and bottom lining sheet may comprise an extruded plasticized polyvinyl chloride (PVC) sheet membrane. One such material is sold under the brand name Koroseal® or High Performance Koroseal® manufactured by R.J.F. International Corporation. Other exemplary materials for the lining or liner include Amer-Plate® or T-Lock® or Arrow-Lock® from Ameron Protective Linings or Exceline from F.C. Witt Associates Ltd. In yet other embodiments, the lining or liner may comprise various other materials, such as rigid PVC type 1, rigid PVC type 2, vinyl or specially formulated flexible PVC, chlorinated polyvinyl chloride (CPVC), polypropylene (PPL), copolymer polypropylene (CoPPL), fiberglass reinforced plastic (FRP), polytetrafluoroethylene (PTFE); ethylene chlorotrifluoroethylene copolymer (ECTFE), polyvinylidene fluoride (PVDF), rubber, a geomembrane, ethylene interpolymer alloy (EIA), etc. In some exemplary embodiments, the sheets of the lining or liner may include full-size RF (radio frequency) welded high performance Koroseal® panels (e.g., Koroseal® flexible PVC sheets, etc.), which helps eliminate lining seams in tank walls and bottom.

In exemplary embodiments, the extrusion welded material may comprise permanent thermoplastic lining materials such as, but not limited to, plasticized polyvinyl chloride, flexible polyvinyl chloride (F-PVC), rigid polyvinyl chloride, chlorinated polyvinyl chloride (CPVC), polyethylene (e.g., high molecular weight polyethylene (HMWPE), high-density polyethylene (HDPE), low-density polyethylene (LDPE), etc.), polyurethane/PVC alloy, synthetic rubber, fluoropolymer (homopolymer, copolymers (e.g., Poly(vinylidene fluoride-co-hexafluoropropene) (PVDF-HFP), etc.) or alloys), ethylene-chloro-tri-fluoro-ethylene (Halar ECTFE), geomembrane, ethylene interpolymer alloy (EIA), laminations of thermoplastic materials such as above, etc. Accordingly, exemplary embodiments include extrusion welding that comprises heating and forcing out, under constant pressure and temperature, thermoplastic material.

In exemplary embodiments, installation personnel may prepare the tank 528 prior to applying the lining or liner to the tank 528. For the surface preparation of the tank 528, the material should preferably be free from physical imperfections and sharp edges on the interior of the tank 528 and should preferably be ground smooth. The thickness and weight per square foot should preferably comply and be within ASTM (American Society for Testing and Materials) tolerances and AISA (American Iron and Steel Institute) tolerances. Furthermore, welded parts of the tank 528 should preferably be fabricated in accordance with standardized commercial practices to obtain a practical and uniform quality. Rectangular open tanks, in particular, should preferably be properly reinforced with girth angles in accordance with accepted practices in order to provide adequate structural strength and prevent bulging. If welding is required on inside corners of the tank, the welds should preferably be smooth with no porosity, high spot lumps, or pockets. The size construction and location of outlets, openings, and/or valve sleeves should preferably be fabricated in accordance with standardized commercial practice.

During preparation, the installer removes sharp edges on the interior surface of the tank 528. The installer then prepares the interior surface of the tank 528, such as by blasting or grinding the interior of the tank 528 to be free from oil, grease, and chemicals. The installer may grit blast steel to a white metal finish in accordance with steel structures and painting standards. The installer may also clean the surface by using steam-cleaning procedures, for example to remove rust, scale, and dirt. After blasting or grinding, remaining debris may then be removed from the tank 528 via brushing or vacuuming. Furthermore, the installer may apply a primer to prevent oxidation of metal surfaces.

With respect to the lining or liner, an installer may process a plurality of sheets, panels, or walls that will eventually form the lining or liner. The installer may process the plurality of sheets at the location of the tank 528 by cutting the sheets from a roll of material. The installer may also process the plurality of sheets from the roll of material at an offsite location.

During the cutting process, the installer may pull a portion of the lining material from the roll and places the portion over a cutting surface. In an exemplary embodiment, the height of the lining material may be within a range from about eight feet to about ten feet, and the width may be within a range from about four feet to about eight feet. After the proper size of the length of the lining sheet is determined and pulled from the roll of lining material, the installer may then cut off the portion from the roll material to form the plurality of sheets of lining material.

The lining sheets may have a rectangular configuration. The installer may cut the lining sheets in dimensions for use on the walls 530 and the bottom 532 of the tank 528 (FIG. 5). The lining sheets may contract and expand slightly in width during installation operations and during use due to thermal expansion and contraction. Allowance for such dimensional changes may be made when cutting the sheets. The installer may manually cut the lining sheets from the roll of lining material. In an exemplary embodiment, the thickness of the lining sheets may be at least about $3/32$ inches. In another exemplary embodiment, the thickness of the lining sheets is about $3/16$ inches. These dimensions disclosed in this paragraph (as are all dimensions disclosed herein) are example in nature as other exemplary embodiments of a lining may be sized dimensionally larger or smaller depending on the tank to which they will be applied.

The lining sheets may be further processed as disclosed in U.S. Published Patent Applications US2017/0369236 and/or 2017/0369238, which are incorporated herein by reference in their entirety. By way of example, the installer at the tank site may clean and prepare surfaces of the tank 528 and the backside of the lining sheets so that the installer can apply adhesive cement (or other suitable adhesive) to both the prepared surfaces of the tank 528 and the back sides of the lining sheets. The installer, as part of the cleaning process, may swab the surface of the back of the lining sheets with methyl ethyl ketone. In addition to, or alternatively to the adhesive cement, the installer may use double-sided adhesive tape between the tank 528 and lining sheets. In an exemplary embodiment, 3M® VHB (very high bond) tape may be used between the tank 528 and lining sheets to help hold the lining sheets in place relative to the tank 528.

More than one coat of adhesive cement may be applied to the tank surface and the backside of the lining sheets. When applying adhesive cement with a paint roller, for example, the installer may use a short roller in order to prevent excessive adhesive cement build up along the tank surface and the backsides of the lining sheets. In the event the lining sheets cannot be applied to the prepared surface of the tank for an extended period of time and the adhesive cement loses its tack, the adhesive cement surface may be refreshed or re-tackified by applying one or more additional coats of adhesive cement.

After the surface of the tank 528 and the back sides of the lining sheets have been properly adhesively cemented, the installer may bond the bottom lining sheet to the bottom 532 of the tank 528. The installer may place the bottom lining sheet against the prepared bottom 532 of the tank 528 and bond the bottom lining sheet to the bottom 532 of the tank 528. For example, the installer may roll or pressure the bottom sheet to the bottom 532 of the tank 528 to avoid trapping air between the bottom sheet and the tank 528. The bottom sheet is bonded to the bottom 532 of the tank 528 making sure the bottom edges are positioned flush against the sidewalls 530 of the tank 528. Additionally, the installer may press and roll the bottom lining sheet into the corners 536 in such a manner as to prevent bridging. In rolling out the air during the placement of the bottom lining sheet, the installer may roll from the center of the bottom lining sheet and progressively from one end to the other to avoid pocketing air.

After bonding the bottom lining sheet, the installer may then bond other lining sheets to adjacent walls 530 of the tank 528. The installer may then bond the lining sheets to the walls 530 of the tank 528 by rolling or by pressuring the lining sheets to the walls 530 of the tank 528 to avoid trapping air between the lining sheets and the walls 530 of the tank 528. The lining sheets may be bonded to the walls 530 of the tank 528 making sure the bottom edges of the lining sheets are positioned flush against the bonded bottom lining sheet. The installer may press and roll the lining sheets into the corners 536 in such a manner as to prevent over-slipping.

After the lining sheets, corner lining sheet 692, and bottom lining sheet are properly bonded to the tank 528, the installer may then activate a handle-held extrusion-welding device. See, for example, the handle-held extrusion-welding device 58 shown in FIG. 10 of U.S. Published Patent Applications US2017/0369236. In this example, the welding device is made up essentially of a hand-held drill serving as the drive system and removable attachment for the drill. In the attachment, a strand of thermoplastic material, supplied via one or several feed channels from a feed device, is chopped up. The thermoplastic material is heated in a conveying device usually in the form of a worm conveyor and a plastering device so that the chopped thermoplastic material reaches a plastic state and is then expelled as welding material through a welding chute of the welding device. The chute includes a degenerating device in the shape of an internal blower as well as a heating device.

The installer extrusion welds the lining sheets together by infusing molten thermoplastic material along the lining sheets, e.g., within beveled regions of the lining sheets, etc. Infusing molten thermoplastic material comprises introducing the thermoplastic material through and/or over and/or into the intersection of the associated lining sheets. For example, the extrusion welding may infuse molten thermoplastic material within a gap, void, or beveled regions separating edges of adjacent lining sheets. Due to the uniformity of the edges, the weld infuses within the edge (e.g., beveled, etc.) regions to seal the adjacent pair of lining sheets together. In welding the adjacent pair of lining sheets, the installer may typically weld from the top of the interface between the pair of lining sheets to the bottom of the interface. The installer may repeat the thermoplastic welding process for other pairs of adjacent lining sheets bonded to the remaining corners of the tank 528.

The extrusion weld may reinforce the material of the lining from reduction of the physical properties of the lining material that may occur during the installation process. The extrusion weld is different from other welds, such as the "cap over" flat strip weld or "cap over" corner strip weld previously discussed above in the background section. In exemplary embodiments in which the infusion of the thermoplastic material is an automated process via an extrusion welder, the thermoplastic material may be applied under controlled parameters, such as constant pressure and constant temperature over time, which, in turn, helps to minimize, reduce, or preferably eliminate pinholes. Also in exemplary embodiments, the extrusion welder may control melt pressure and melt temperature with a display and control box for convenient operation and monitoring. Because of the controlled pressure and temperature, the extruded thermoplastic material may thus fuse more material within the lining sheets than other weld methods. With this automatic application of thermoplastic material under controlled parameters, a thicker, deeper, and stronger extrusion weld may be created while also reducing, minimizing, or preferably eliminating pinholes.

Figure 10:
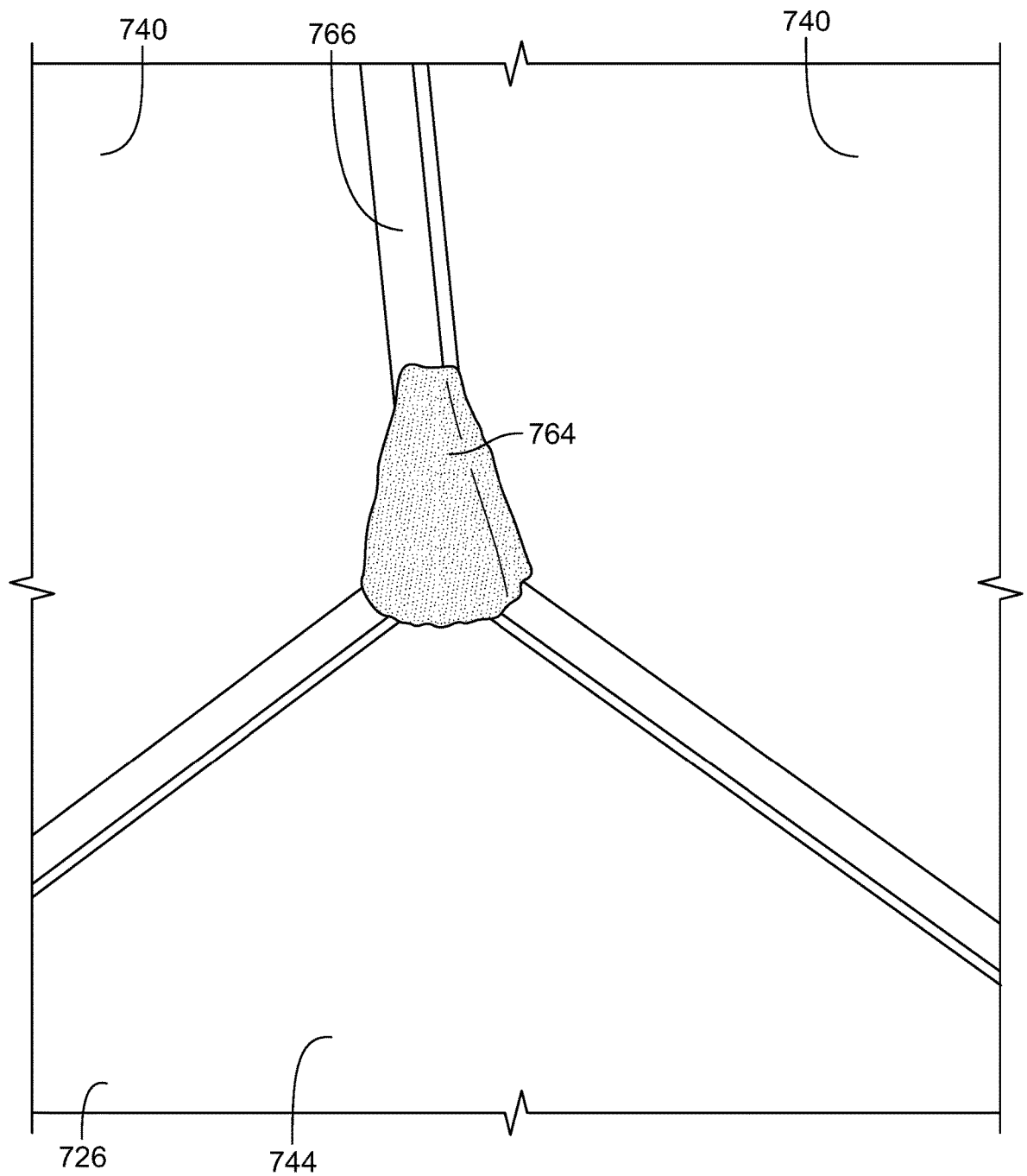
FIG. 10 shows an exemplary embodiment of a corner insert within a corner of a lining. The corner insert may be extrusion weldable to the lining in accordance with and embodying one or more aspects of the present disclosure.

FIG. 10 shows an exemplary embodiment of a corner insert 764 (broadly, a corner attachment or corner reinforcement) positioned within a corner 766 of a lining 726. By way of example, the corner insert 764 may be extrusion welded to the corner 766 of the lining 726.

The corner insert 764 is configured (e.g., via mold casting, molding, etc.) to have a generally triangular shape. For example, the insert 764 may be generally hollow and have a truncated triangular pyramidal configuration (triangular pyramidal frustum).

The corner insert 764 may be made from a wide variety of materials including the materials disclosed herein and/or the materials disclosed in U.S. Published Patent Applications US2017/0369236 and/or 2017/0369238. For example, the corner insert 764 may be made from the same material as the lining 726. Or, for example, the corner insert 764 may be made from a different material than the lining 726. By way of example, the corner insert 764 and/or lining 726 may be made from rigid polyvinylchloride, chlorinated polyvinyl chloride (CPVC), polyethylene, polypropylene, polyvinylidene fluoride (PVDF), Kynar® polyvinylidene fluoride (PVDF), ethylene interpolymer alloy (EIA), geomembrane, etc.

In an exemplary embodiment, the corner insert 764 comprises mold casted polyvinylidene fluoride (PVDF). In another exemplary embodiment, the corner insert 764 comprises mold casted plasticized polyvinyl chloride (e.g., Korosealo material, etc.). In another exemplary embodiment, the corner insert 764 is mold casted from a material capable of withstanding relatively high temperatures, e.g., without bubbling out due to high elevated heating or exothermic heating from chemical reactions, etc.

Figure 11:
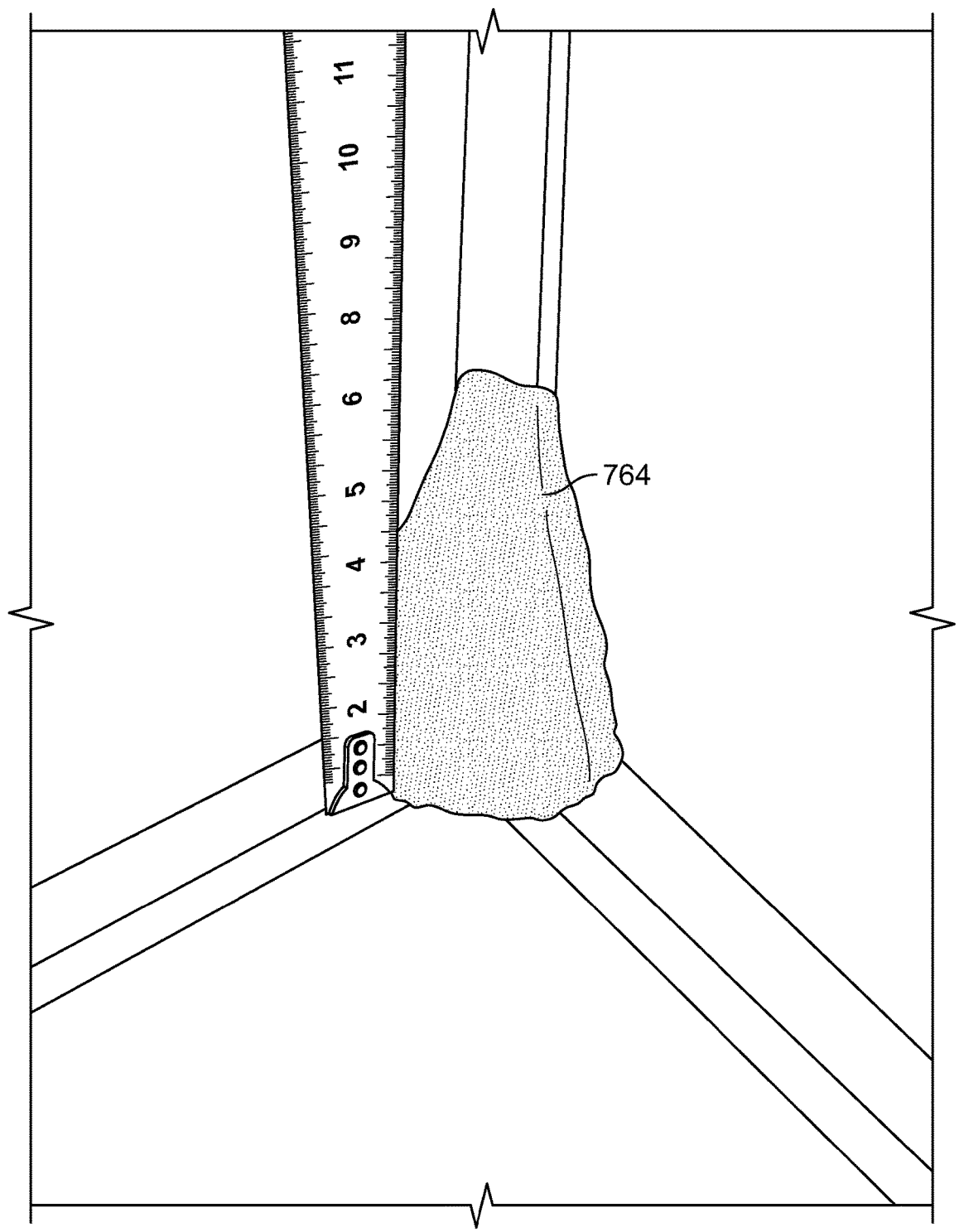
FIGS. 11 and 12 shows the corner insert of FIG. 10 along with a tape measure for purposes of illustration only.
Figure 12:
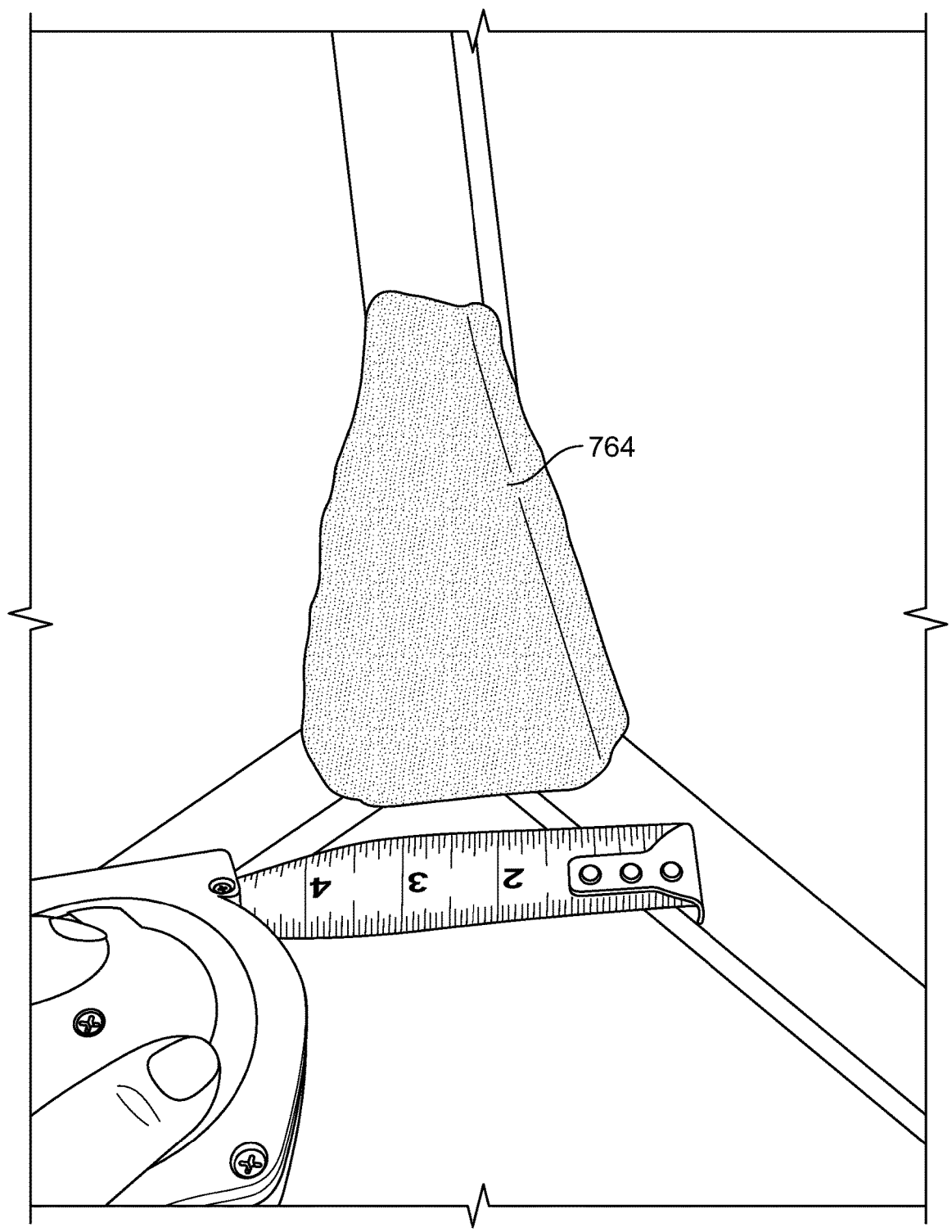

The insert 764 may vary in size. For example, FIGS. 11 and 12 show the corner insert 764 along with a tape measure for purposes of illustration only. As shown in FIG. 11, the corner insert 764 may have a height of about six inches. As shown in FIG. 12, the corner insert 764 may have a maximum width of about 4 inches along a bottom or base of the corner insert 764. The dimensions shown in FIGS. 11 and 12 are provided as examples only as other exemplary embodiments may include corner inserts configured differently, e.g., taller, shorter, wider, narrower, etc.

An installer may position a corner insert 764 at one or more corners 766 of the lining 726. For example, a corner insert 764 may be positioned at each corner 766 of the lining 726. As shown in FIG. 10, the corner 766 is formed by the pair of side lining sheets 740 and bottom sheet 744 of the lining 726.

An installer may extrusion weld the corner insert 764 to the infused pair of side sheets 740 and the bottom sheet 744. Extrusion welding the corner insert 764 to the lining corner 766 may comprise infusing molten thermoplastic material at a predetermined distance beyond the corner insert 764 and along the infused pair of side sheets 740 and bottom sheet 744. Infusing molten thermoplastic material may comprise introducing the thermoplastic material through and/or over and/or into the intersection of the associated sheets and corner insert 764. Thermoplastic material may be infused under the controlled parameters of constant pressure and constant temperature over time to help reduce, minimize, or preferably eliminate pinholes. This welding may enhance the strength of the weld between the corner insert 764 and the lining corner 766. The predetermined distance beyond the corner insert 764 may fall within a range from about two inches to about four inches. The installer may repeat the welding of corner inserts 764 to each of the remaining corners 766 of the lining 726.

The inner bottom corners where three intersecting lining sheets must be joined are typical problem areas and a frequent source of early leaks and premature lining failures with conventional linings in that it is difficult to perform a high-quality weld in a corner. This is because high-quality welds need the right speed, temperature, and pressure as the welding machine is moved along the joint. But at a corner, the lining sheets can't be preheated because the welding machine stops. In exemplary embodiments disclosed herein, the corner inserts enable continuous higher quality extrusion welds between adjacent side and bottom lining sheets along inside bottom corners of the tank. Also with the hot gas/hot air extrusion welding machine techniques, the welding rod may be fully melted, which results in a homogenous weld with fewer stresses. The weld may be formed in a single pass further reducing stresses that would otherwise be introduced by the multiple passes common in traditional hand welding. Accordingly, exemplary embodiments disclosed herein may allow for extrusion welding that is faster and is less sensitive to surface oxidation.

Exemplary embodiments of linings and liners disclosed herein may be used with virtually any type of (e.g., for different uses, formed from different materials (e.g., steel, fiberglass, rubber, lead, plastic, etc.) different shapes and sizes, etc.) process tank, indoor or outdoor containment pit, other storage or containment vessels (e.g., grain storage, etc.), etc. Exemplary embodiments may also be configured as relatively rigid "drop-in" thermoplastic liners that possess superior perimeter machine welds, which are mechanically anchored to the tank or to a framework for placement into the tank in a manner such that the liner does not float in the tank. A liner may be configured for use as a flexible or foldable drop-in bag liner, for use a drop-in liner for a tank and/or for use as a standalone tank.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of lining a storage/containment vessel including a bottom and sidewalls defining an internal volume usable for storage/containment of material, the sidewalls including at least one pair of adjacent sidewalls that intersect perpendicularly to thereby define at least one internal corner therebetween having a perpendicular profile, the method comprising positioning an elongate member within the storage/containment vessel along the at least one internal corner, whereby a profile of the at least one internal corner is changed from the perpendicular profile to a non-perpendicular and/or cornerless profile, wherein:
the elongate member has a hollow cross section.

2. The method of claim 1, wherein the elongate member has a length equal to a height of the at least one pair of sidewalls such that elongate member extends lengthwise along an entire length of the at least one internal corner from the bottom of the storage/containment vessel to a top of the at least one pair of sidewalls.

3. The method of claim 1, wherein the elongate member comprises a hollow steel beam having a cross section shaped as a right triangle.

4. The method of claim 1, wherein the elongate member has the hollow cross section in the shape of an isosceles right triangle such that a transition from each sidewall of the at least one pair of adjacent sidewalls to the elongate member is at an angle of about 135 degrees.

5. The method of claim 1, wherein the elongate member is configured such that a transition from each sidewall of the at least one pair of adjacent sidewalls to the elongate member is at an obtuse angle.

6. The method of claim 1, further comprising positioning a lining sheet along the at least one elongate member.

7. The method of claim 6, further comprising extrusion welding the lining sheet positioned along the elongate member to thereby provide the lining along the at least internal corner having the non-perpendicular and/or cornerless profile.

8. The method of claim 1, further comprising:
positioning a corner lining sheet having first and second opposite edge portions along the elongate member; and
extrusion welding the first and second opposite edges portions of the corner lining sheet to corresponding edge portions of at least one or more side lining sheets.

9. The method of claim 8, wherein the method includes:
attaching the corner lining sheet to the elongate member to retain the corner lining sheet in place before extrusion welding the corner lining sheet to the at least one or more side lining sheets; and/or
attaching the at least one or more side lining sheets to the at least one pair of sidewalls to retain the one or more side lining sheets in place before extrusion welding the corner lining sheet to the at least one or more side lining sheets.

10. The method of claim 8, further comprising extrusion welding a bottom lining sheet to the corner lining sheet and the at least one or more side lining sheets.

11. The method of claim 1, wherein:
the storage/containment vessel includes a plurality of adjacent pairs of sidewalls that intersect perpendicularly to thereby define a plurality of internal corners therebetween each having a perpendicular profile; and
the method comprises positioning an elongate member within the storage/containment vessel along each internal corner, to thereby change the profile of each internal corner from the perpendicular profile to the non-perpendicular and/or cornerless profile.

12. The method of claim 11, wherein the method includes using a single lining sheet along all of the sidewalls of the storage/containment vessel to thereby provide the lining along all of the sidewalls of the storage/containment vessel that is defined by the single lining sheet instead of a plurality of lining sheets.

13. A method of lining a storage/containment vessel including a bottom and one or more sidewalls defining an internal volume usable for storage/containment of material, the method comprising:
providing the storage/containment vessel with at least one internal corner having a non-perpendicular and/or cornerless profile; and
positioning a lining sheet within the storage/containment vessel along the at least one internal corner having the non-perpendicular and/or cornerless profile;
wherein:
providing the storage/containment vessel with at least one internal corner having a non-perpendicular and/or cornerless profile comprises positioning an elongate member having a hollow cross section within the storage/containment vessel along the at least one internal corner, whereby a profile of the at least one internal corner is changed from the perpendicular profile to a non-perpendicular and/or cornerless profile.

14. The method of claim 13, wherein:
the storage/containment vessel includes at least one pair of adjacent sidewalls that intersect perpendicularly and define the at least one internal corner therebetween having a perpendicular profile.

15. The method of claim 14, wherein:
the elongate member has a length equal to a height of at least one pair of sidewalls such that elongate member extends lengthwise along an entire length of the at least one internal corner from the bottom of the storage/containment vessel to a top of the at least one pair of sidewalls; and
the elongate member has the hollow cross section shaped as a right triangle and configured such that a transition from each sidewall of the at least one pair of adjacent sidewalls to the elongate member is at an obtuse angle.

16. The method of claim 13, wherein the lining sheet is a corner lining sheet having first and second opposite edge portions; and wherein the method includes:
extrusion welding the first and second opposite edges portions of the corner lining sheet to corresponding edge portions of at least one or more side lining sheets; and
extrusion welding a bottom lining sheet to the corner lining sheet and the at least one or more side lining sheets.

17. The method of claim 13, wherein:
the storage/containment vessel includes a plurality of adjacent pairs of sidewalls that intersect perpendicularly to thereby define a plurality of internal corners therebetween each having a perpendicular profile; and
the method comprises changing a profile of each internal corner from the perpendicular profile to the non-perpendicular and/or cornerless profile.

18. The method of claim 13, wherein providing the storage/containment vessel with at least one internal corner having a non-perpendicular and/or cornerless profile comprises initially making the storage/containment vessel to integrally include the at least one internal corner having the non-perpendicular and/or cornerless profile without having to separately add an elongate member within the at least one internal corner.

19. The method of claim 13, wherein the line sheet is a single lining sheet, and the method comprising using the single lining sheet along all of the sidewalls of the storage/containment vessel such that lining along all of the sidewalls of the storage/containment vessel is defined by the single lining sheet instead of a plurality of lining sheets.

* * * * *